US006943123B2

(12) United States Patent
Ruldolph et al.

(10) Patent No.: US 6,943,123 B2
(45) Date of Patent: Sep. 13, 2005

(54) SILICA MEMBRANES AND PROCESS OF PRODUCTION THEREOF

(75) Inventors: Victor Ruldolph, St Lucia (AU); Joao Carlos Diniz Da Costa, St Lucia (AU); GaoQing Lu, Middle Park (AU)

(73) Assignee: The University of Queensland, Queensland (AU)

( * ) Notice: Subject to any disclaimer, the term of this patent is extended or adjusted under 35 U.S.C. 154(b) by 83 days.

(21) Appl. No.: 10/297,561

(22) PCT Filed: Jun. 12, 2001

(86) PCT No.: PCT/AU01/00692
§ 371 (c)(1),
(2), (4) Date: Aug. 15, 2003

(87) PCT Pub. No.: WO01/93993
PCT Pub. Date: Dec. 13, 2001

(65) Prior Publication Data
US 2004/0038044 A1 Feb. 26, 2004

(51) Int. Cl.[7] ............................................. H01L 21/469
(52) U.S. Cl. ..................... 438/778; 438/763; 438/780
(58) Field of Search ........................................ 438/778

(56) References Cited

U.S. PATENT DOCUMENTS 5,858,457 A * 1/1999 Brinker et al. .............. 427/162
6,536,604 B1 * 3/2003 Brinker et al. .............. 210/490

FOREIGN PATENT DOCUMENTS

WO      WO/91/12879      5/1991
WO      WO/0039028      6/2000

OTHER PUBLICATIONS

Brinker, C.J. Scherer G. W. Sol–Gel Science: the physics and chemistry of the sol gel processing, Academic Press, San Diego, USA (1990) selected chapters.

Raman N. K. & Brinker C.J., Organic template approach to molecular sieving silica membranes, J. Membrane Science, 105, 273–279 (1995).

Kusakabe K., Sakamoto S., Saie T., & Morooka S., Pore structure of silica membranes formed by a sol–gel technique using tetraethyloxysilane and alkyltriethyloxysilanes, Sep. and Pur. Tech., 16, 139–146 (1999).

De Vos R. M. & Verweij H. Improved performance of silica membranes for gas separation, J. Membrane Science, 143, 37–51 (1998).

Lin C. L., Flowers D. L., & Liu P.K.T., Characterisation of ceramic membranes II., Modified commercial membranes with pore size under 40A, J. Membrane Science, 92, 45–58 (1994).

(Continued)

Primary Examiner—Thao P. Le
(74) Attorney, Agent, or Firm—Gordon & Rees LLP

(57) ABSTRACT

A method of producing a weakly branched silica membranes coated onto a substrate using a two-step catalysed hydrolysis sol-gel process. A tetraethylorthosilicate (TEOS)/ethanol solution is formed and placed in an ice bath. An acid/water solution is formed and added to the TEOS/ethanol solution, to form a TEOS/ethanol/acid/water solution, which inturn is refluxed. A two-step sol is prepared by adding water and nitric acid to the refluxed TEOS/ethanol/acid/water solution and initiating a two-step sol-gel process. From the two-step sol a membrane film layer is deposited on a substrate, for use in a number of applications, including selective separation of gases.

13 Claims, 4 Drawing Sheets

OTHER PUBLICATIONS

Figure 1A:
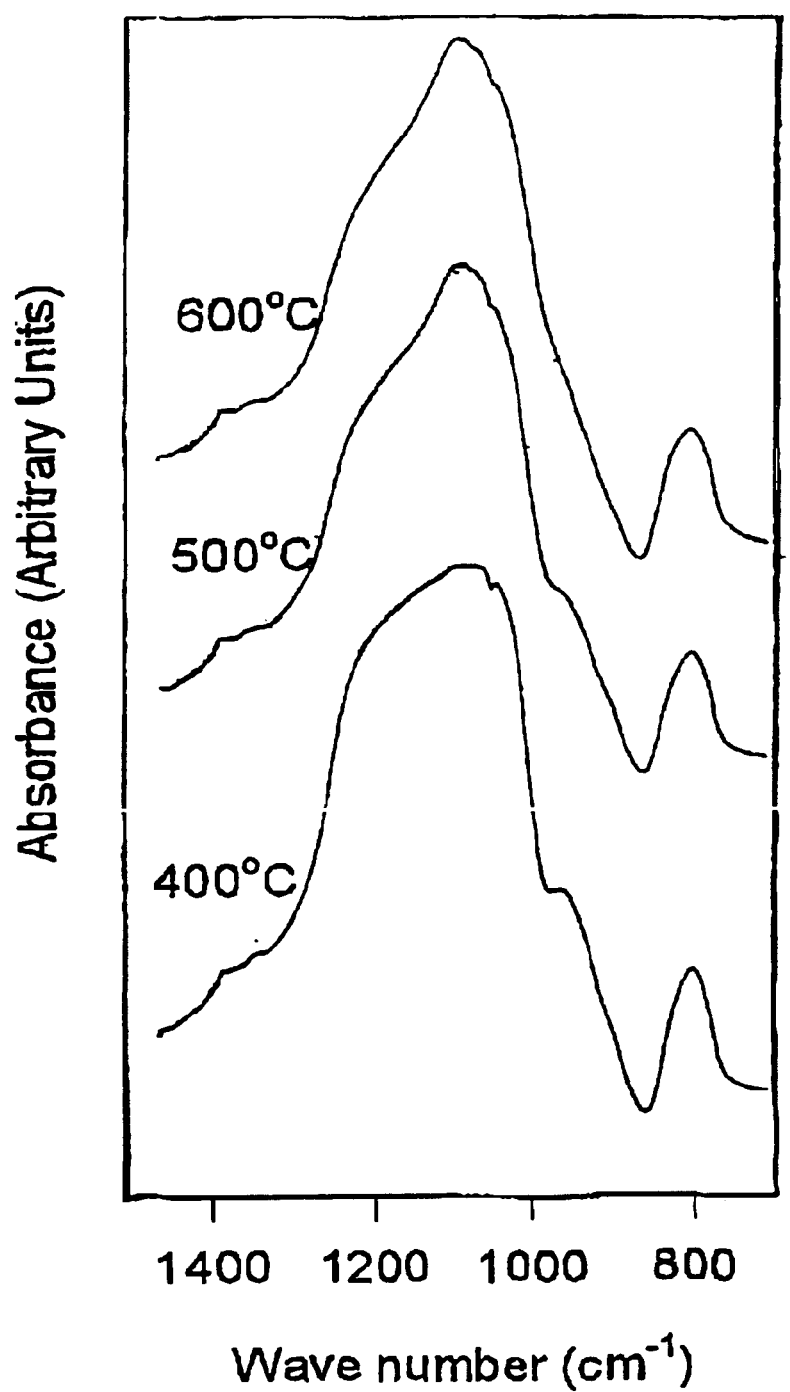

Wu J.C. S., Sabol H., Smith G.W., Flowers D.L. & Liu P.K.T., Characterisation of hydrogen–permselective–microporous ceramic membranes, J. Membrane Science, 96, 275–287 (1994).

Ha H.Y., Woo–Nam S., Hong S.A. & Lee W.K., Chemical vapour deposition of hydrogen–permselective silica film on porous glass support from tertraethylorthosilicate, J. Membrane Science, 85, 279–290 (1993).

Tsapatsis M. and Gavalas G. Structure and aging characteristics of H permselective SiO –Vycor membranes, J. Membrane Science, 87, 282–296, (1994).

Raman N. K. Anderson M.T. and Brinker C.J., Template–based Approaches to the Preparation of Amorphous Nanoporous Silicas, Chem. Mater, 8, 1682–1701.

* cited by examiner

SILICA MEMBRANES AND PROCESS OF PRODUCTION THEREOF

BACKGROUND TO THE INVENTION

Molecular membranes, otherwise known as molecular sieves, are widely known in their use to separate mixtures of gas. Weakly branched molecular sieving silica membranes are of particular interest for use in fuel cells and petrochemical applications for their ability in selectively separating hydrogen and helium from gas mixtures. Environmental applications are also possible with these types of membranes to separate and enrich the methane ($CH_4$) component from landfill gas and biogas. Ideally to fulfil these types of uses the membranes need to have both good pore size control and high permselectivity for hydrogen and helium, that is molecules with a kinetic diameter of less than 3.4 Å.

Sol-gel reaction process are widely employed to form molecular sieves. The use of sol-gel reaction processes are favoured for the formation of microporous dimensions, that is pore size less than 20 Å, in a molecular sieve. Brinker C. J. & Scherer G. W. ("Sol-Gel Science: the physics and chemistry of the sol gel processing", Academic Press, San Diego, USA (1990)), outline that polymeric silicate gels are often synthesised by hydrolysing monomeric tetrafunctional alkoxide precursors, using a mineral acid (HCl) or a base ($NH_3$) as a catalyst. The hydrolysis is then followed by the condensation reactions, an alcohol condensation and/or a water condensation. The resultant product is the formation of siloxan bonds (Si—O—Si), silanols (Si—OH), alcolhol and water, as outlined in the equations (1)–(3) below.

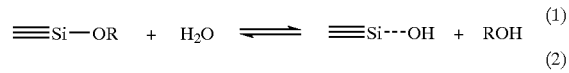

The formation used in the sol-gel process must be finely tuned in order to control the pore size to molecular dimensions. The disadvantages of this process is that the matrix of the weakly branched silica film may be so dense that it results in no or very low permeation of gases.

Raman and Brinker, ("Organic template approach to molecular sieving silica membranes". Journal of Membrane Science, 105, 273–279 (1995)), used tetraethylorthosilicate (TEOS) and methyltriethylsilane (MTES), absolute ethanol (EtOH), distilled water and HCl as the catalyst to produce intermediate film layers. Subsequently, they used several layers of non-hydrolysed TEOS to produce the top film. Raman and Brinker produced membranes with good poor size control for $CO_2$ and $CH_4$ separation, but with low permselectivity to $He/CO_2$. The use of HCl as a catalyst in the preparation of the MTES/TEOS intermediate layer, Raman and Brinker does not provide for fine control over the pore size.

Kusakabe K., Sakamoto S., Sale T., and Morooka S., ("Pore structure of silica membranes formed by a sol-gel technique using tetraethytoxysilane and alkyltriethyloxysilanes" Sep. and Pur. Tech., 16, 139–146 (1999)), prepared templated membranes from TEOS and alkyltriethyloxysilianes. These membranes had reasonable pore size control and higher permeation but lower permselectivities for molecules with a kinetic diameters less that 3.4 Å.

De Vos R. M. and Verweij H. ("Improved performance of silica membranes for gas separation", Journal of Membrane Science, 143, 37–51, (1998)) produced membranes using a single step catalysed hydrolysis sol-gel process and calcined at 400° C., with high permeancance to indicating that the permselectivity ability of these membranes is low for $H_2$ and $CO_2$ permeation. However when these membranes where calcined at 600° C. the permselectivity for $H_2$ and $CO_2$ increased by tenfold. The increase in permselectivity is mainly caused by pore reduction due to heat treatment but it also reduces permeation of gases.

Another technique for producing silica membranes is through the use of chemical vapour deposition (CVD) process as outlined by Lin C. L., Flowers D. L., and Liu P. K. T., ("Characterisation of ceramic membranes II. Modified commercial membranes with pore size under 40 Å", Journal of Membrane Science, 92, 45–58, (1994)) and Wu J. C. S., Sabol H., Smith G. W., Flowers D. L. and Liu P. K. T., ("Characterisation of hydrogen-permselective microporous ceramic membranes", Journal of Membrane Science, 96, 275–287, (1994)). Ha H. Y., Woo-Nam S., Hong S. A. and Lee W. K., ("Chemical vapour deposition of hydrogen-permselective silica film on porous glass support from tertraethylorthosilicate", Journal of Membrane Science, 85, 279–290. (1993)) and Tsapatsis M. and Gavales G., ("Structure and aging characteristics of $H_2$ permselective $SiO_2$ Vycor membranes", Journal of Membrane Science, 87, 282–296, (1994)) used chemical vapour deposition using vycor glass tubes as substrates. The membranes produced by the chemical vapour deposition have high permeance for $H_2/N_2$ and good separation capabilities for $He/H_2$. Chemical vapour deposition requires considerably more equipment and may be more expensive than film dip coating processes.

OBJECT OF THE INVENTION

It is an object of the present invention to provide a two-step catalysed hydrolysis process for the production of weak branched silica molecular sieves with high permselectivity to hydrogen and helium, which overcomes or ameliorates one or more disadvantages of the prior art.

Further objects will be evident from the following description.

DISCLOSURE OF THE INVENTION

In one form, although it need not be the only or indeed the broadest form, the invention resides in a method of producing weakly branched silica membranes coated onto a substrate using a two-step catalysed hydrolysis sol-gel process including:

forming a tetraethylorthosilicate (TEOS)/ethanol solution;

placing the TEOS/ethanol solution in an ice bath;

forming an acid/water solution;

adding the acid/water solution to the TEOS/ethanol solution to form a TEOS/ethanol/acid/water solution;

refluxing the TEOS/ethanol/acid/water solution;

preparing a two-step sol by adding water and nitric acid to the refluxed TEOS/ethanol/acid/water solution and initiating a two-step sol-gel process;

depositing a membrane film layer on a substrate from the two-step sol to form a substrate coated with weakly branched silica membranes.

In preference the TEOS/ethanol/acid/water solution prior to refluxing has a molar composition of 1.0 TEOS:3.8 ethanol:1.0 water:$7.0 \times 10^{-4}$M nitric acid. Suitably the two-step sol would have a molar composition of 1.0 TEOS:3.8 ethanol:6.0 water:0.1 nitric acid.

The refluxing step is preferably carried out at approximately 60° C. for about 180 minutes in a water bath.

Suitably the substrate is prepared with one or more prime layers and/or one or more intermediate layers. Preferably the membrane is formed by coating the substrate with the two-step sol either with or without the prime and intermediate layers, in addition it is preferably that the substrate coated with the membrane is heat treated. The heat treatment step is suitable carried out at temperatures between 400° C. and 600° C. with an air flow of 100 ml per minute. Preferably the heat treatment is carried out at about 500° C.

In another form the invention resides in a weakly branched silica membrane produced from the above two-step catalysed hydrolysis sol-gel process.

In preference, the weakly branched membrane has a pore an average size of less than 3 Å and a film thickness of between 0.1 and 0.5 μm.

In yet another form, the invention resides in a method of selectively separating hydrogen and helium from a gas mixture using a weakly branched silica membranes.

BRIEF DETAILS OF THE DRAWINGS

To assist in understanding the invention, preferred embodiments will now be described with reference to the following figures in which:

FIG. 1A FTIR spectra of two-step membrane.

Figure 1B:
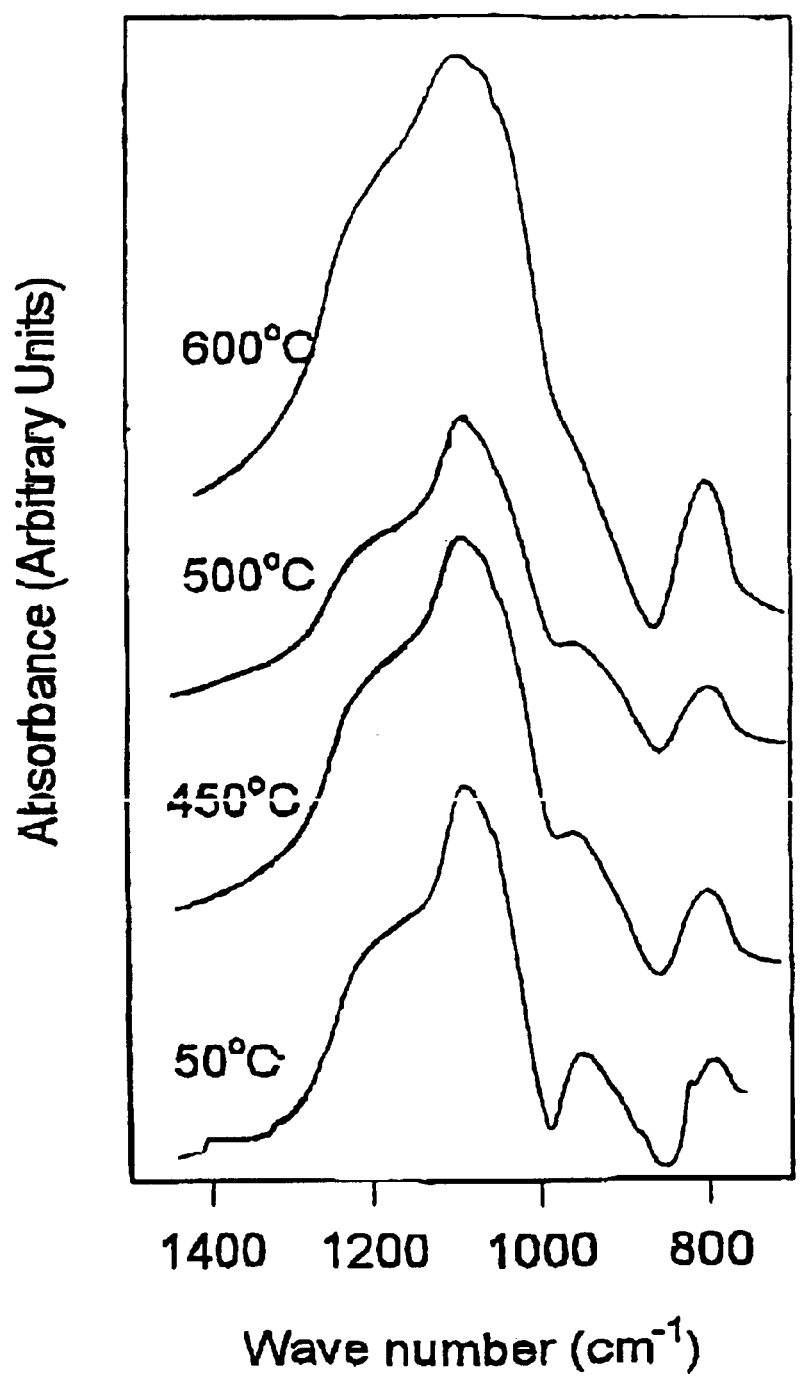

FIG. 1B FTIR spectra of single-step membrane.

Figure 2A:
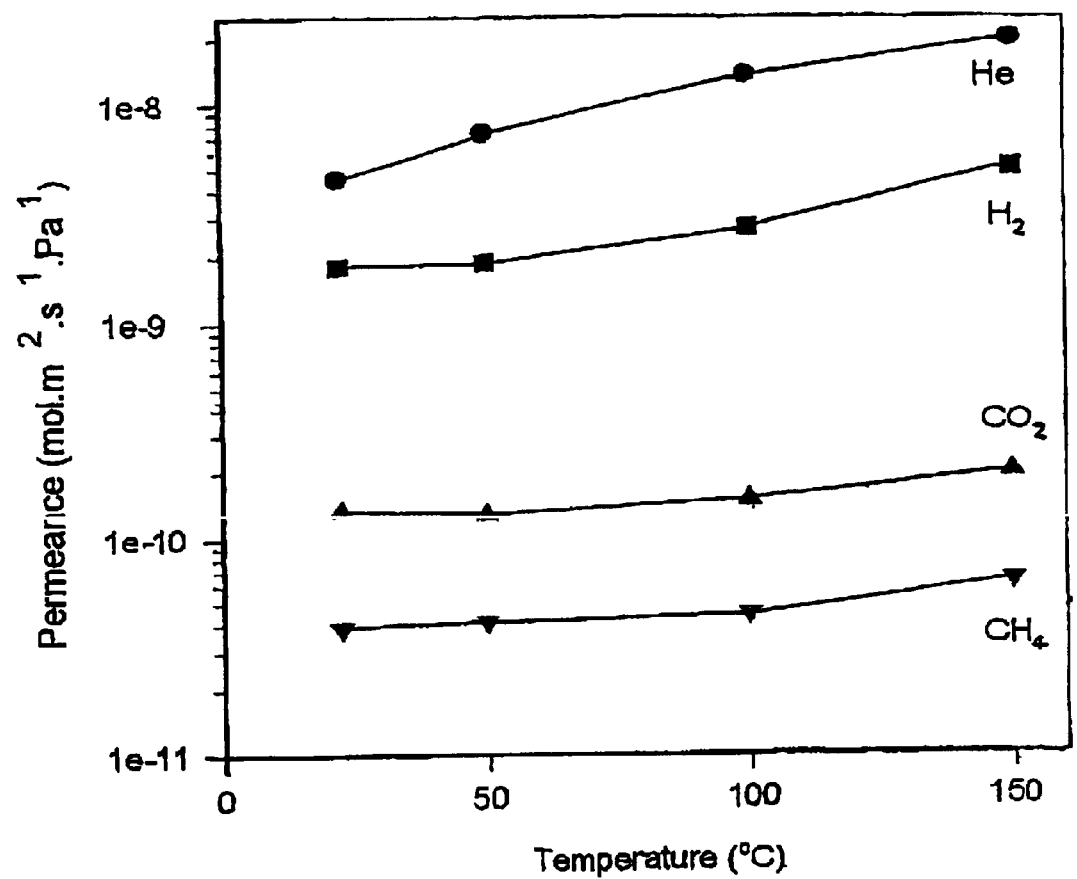

FIG. 2A Permeance of single-step membrane to various gases as a function of temperature.

Figure 2B:
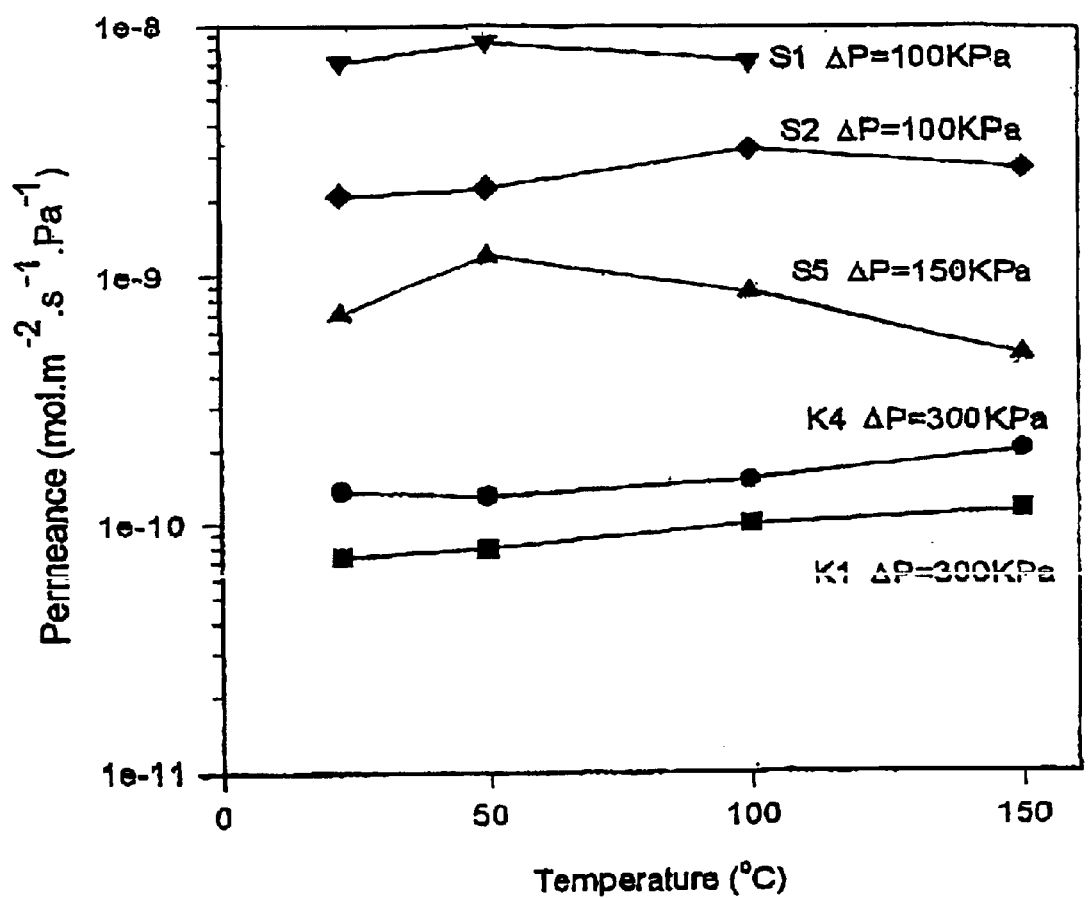

FIG. 2B Permeance of various membranes to $CO_2$ as a function of temperature.

Hereinafter the term "single-step membranes" will be used to describe those membranes of the example that are produced by a single step catalysed hydrolysis sol-gel process. Similarly the term "two-step membrane" is used to describe those membranes of the example that are produced by the two-step catalysed hydrolysis sol-gel process of the invention.

DETAILED DESCRIPTION OF THE DRAWINGS

In general. FIGS. 1A and B show the FTIR spectra for the membranes produced in the Example and outlined in Table 1 by the two-step and a single-step catalysed hydrolysis process, respectively.

FIGS. 2A and B show the permeance of two step and single step membranes to various gases as a function of temperature.

EXAMPLE

The membrane films are formed by a two-step catalyses hydrolysis solution. The single step catalysed hydrolysis process and the resulting membranes are produced for comparison purposes. A range of membranes are synthesised and their formation and layering characteristics are outlined in Table 1. The top film layers of the J membranes are films produced from the two-step process, while the K membranes are produced from a mix of two-step films coated on the top of a single-step film and the S membranes are produced solely from the single-step films.

Two-step Catalysed Hydrolysis Process—Tetraethylorthosilicate (TEOS) and absolute ethanol are placed in an ice bath. 1M nitric acid and distilled water is added dropwise to the TEOS/ethanol solution, with constant stirring. The resultant molar ratio of the respective reactants is 1 TEOS:3.8 ethanol:1 water:$7 \times 10^{-4}$M nitric acid. The solution is then refluxed with constant stirring at 60° C. for 180 minutes in a water bath. Additonal water and nitric acid are added until a molar ratio of 1 TEOS:3.8 ethanol:6 water:0.1 nitric acid is achieved. This sol-gel process provides sots with reasonably low water:silica ratios which inhibit condensation reactions and produce a weakly branched system sol-gel.

Single step catalysed hydrolysis—TEOS, absolute ethanol, 1M nitric acid and distilled water are mixed to form a molar ratio of 1.0 TEOS:3.8 ethanol:6.0 nitric acid:0.1 water. The resultant solution is aged at 50° C. in a temperature controlled oven for 0.33 $t_g$, which is equivalent to 33% of the time required to gel the single-step sol.

Dilution—Both the two-step and single-step catalysed sols where volumetrically diluted to 1:19 with ethanol before forming membrane films. Dilution is used to obtain a suitable sol for substrate coating, that is forming films which do not have defects such as developing micro cracks during heat treatment.

Substrate—The silica membranes are formed on α-alumina support substrates, 99.8% purity, 2 cm thick and with an average pore size of 0.5–1 μm and a porosity of 30%. The supports are smoothed using sandpaper, cleaned in ethanol and calcined up to 600° C. for 4 hours. The calcining and subsequent cooling is carried out at a rate of 1° C. per minute.

The support is then coated with either two layers of;

a) modified Locron alumina solution (supplied by Bayer), diluted 1:4 in ethanol; or b) two layers of template sols and methyltriethyloxysilane (MTES) and tetraethylorthosilicate (TEOS) containing a x/y (MTES/TEOS) molar ratio, which is then calcined at temperature range of 400–600° C. and maintained at the desired temperature for 4 hours, with ramping and cooling down rates of 1° C. per minute.

Membrane deposition is achieved by dip coating the support into the diluted sol for a period of 60 seconds, and removing it at a rate of 20 cm per minute. The dip coating is carried out in a clean cupboard to avoid dust affecting the membrane and increasing the risk of defects in the membrane.

The membranes are placed on the inside of a quartz glass tube, before being placed in a cylindrical furnace for heat treatment with an air flow at 100 ml per minute.

Table 1 shows the layer compositions of membrane samples produced and their respective heat treatment temperatures.

TABLE 1

Membrane synthesis including number of layers, material type and calcination temperature.

| Code | Top layer | Intermediate layer | Primer layer |
|---|---|---|---|
| J1 | 6 TS 500° C. | 2 10/90$^a$ 600° C. | 2 LM 600° C. |
| J2 | 6 TS 500° C. | 2 10/90$^a$ 600° C. | 2 LM 600° C. |
| J4 | 5 TS 500° C. | 2 10/90$^a$ 600° C. & 2 50/50 600° C. | 2 LM 600° C. |
| K1 | 2 TS 500° C. | 2 SS$^b$ 500° C. & 2 10/90$^a$ 600° C. | 2 LM 600° C. |
| K2 | 2 TS 500° C. | 2 SS$^b$ 500° C. & 2 10/90$^a$ 600° C. | 1 LM 600° C. |
| K3 | 2 TS 500° C. | 2 SS$^b$ 500° C. & 2 10/90$^a$ 600° C. | 1 LM 600° C. |
| K4 | 1 TS 500° C. | 1 SS$^b$ 500° C. & 2 10/90$^a$ 600° C. | 2 LM 600° C. |
| K5 | 1 TS 500° C. | 1 SS$^b$ 500° C. & 2 10/90$^a$ 600° C. | 1 LM 600° C. |
| S1 | 6 SS 400° C. | 2 10/90$^b$ 400° C. & surface treatment (HNO$_3$) | 2L 400° C. |
| S2 | 6 SS 400° C. | 2 10/90$^b$ 400° C. & surface treatment (HCl) | 2L 400° C. |
| S3 | 6 SS 400° C. | 2 10/90$^b$ 400° C. & surface treatment (HCl) | 2L 400° C. |
| S4 | 6 SS 400° C. | 2 10/90$^b$ 400° C. & surface treatment (HNO$_3$) | 2L 400° C. |
| S5 | 6 SS 400° C. | 2 10/90$^b$ 550° C. & surface treatment (HNO$_3$) | 2L 400° C. |
| S6 | 6 SS 400° C. | 2 10/90$^b$ 550° C. & surface treatment (HNO$_3$) | 2L 400° C. |

SS = single step
L = locron
$^a$aged for $t_g$ = 0.04 at 50° C.
TS = two step
LM = locron modified sol-gel
$^b$aged for $t_g$ = 0.25 at 50° C.

In each of the columns 2, 3 and 4 of Table 1 above, the first number is the number of layers present; the following part in the column is the composition of the layers being either a) the sol-gel process used, either two-step (TS) or single step (SS), b) the MTES/TEOS molar ratio (10/90 or 50/50), or c) whether the prime layer is locron (L) or locron modified sol-gel (LM); followed by the calcination temperature for each of the layers. The layers are deposited and sequentially calcined. This means that the prime layer is deposited on the substrate support and then calclined after each subsequent film deposition.

Chracterisation of the membrane films produced in Table 1—A range of characterisation tests were carried out on the membranes produced in Table 1, including FTIR, NMR, permeation comparisons, permselectivity and determining the energy of mobility.

FTIR Spectra—The FTIR spectra are shown in FIGS. 1A and B. It can be seen from a comparison of FIGS. 1A and B that the spectra show a similar structural evolution with the increase in temperature. The siloxane groups peak at approximately 1090 cm$^{-1}$ becomes more prominent with an increase in temperature, for the two-step membranes above 500° C. while for the single step membranes the shoulder becomes more predominant at above 400° C. The spectra also show a significant reduction in the formation of siloxane groups in the two-step membranes from the single-step membranes.

NMR characterisation—NMR spectra on the membranes produced in Table. 1 were carried out. The characterising of features of the NMR spectra for the membranes for Table. 1 are summarised below in Table. 2. Both the single and two-step membrane showed a high concentration of silanols (shown as Q$^2$ and Q$^3$ in the table), while siloxanes (Q$^4$ in the table) are in lower concentrations for the two-stop membranes than in the single step membranes. This highlights the formation of a rather weaker branched system in the two-step process compared to the single-step.

TABLE 2

Breakdown of NMR spectra for single and two-step membrane

| Sample-Temperature | Q$^4$ peak centre*/% Area | Q$^3$ peak centre*/% Area | Q$^2$ peak centre*/% Area |
|---|---|---|---|
| single step-400° C. | −110.8/25.92 | −101.4/67.00 | −91.68/7.08 |
| single step-500° C. | −111.0/27.84 | −101.6/63.26 | −92.19/8.90 |
| single step-600° C. | −111.1/31.49 | −101.6/61.74 | −91.98/6.77 |
| two step-400° C. | −110.9/23.44 | −101.4/69.16 | −91.8/7.44 |
| two step-500° C. | −110.4/23.78 | −101.1/65.58 | −91.84/10.64 |
| two step-600° C. | −110.7/25.75 | −101.2/63.97 | −91.7/10.56 |

*peak centres are in chemical shift units-ppm.

Permeation Comparison—The gas permeation of the sample membranes from Table 1 where measured for a range of temperatures and pressures, the results are outlined in Table 3, below.

TABLE 3

Typical permeance results (mol/m$^{-2}$ · s$^{-1}$ · Pa$^{-1}$)

| Membrane | Gas | Pressure (KPa) | 22° C. | 50° C. | 100° C. | 150° C. |
|---|---|---|---|---|---|---|
| K1 | He | 200 | 4.74E−09 | 9.11E−09 | 2.27E−08 | 3.00E−08 |
| K3 | H$_2$ | 300 | 5.26E−10 | 7.74E−10 | 1.43E−09 | 2.52E−09 |
| K1 | CO$_2$ | 300 | 7.38E−11 | 7.97E−11 | 1.01E−10 | 1.17E−10 |
| K4 | CH$_4$ | 300 | 3.68E−11 | 4.06E−11 | 4.38E−11 | 6.37E−11 |

TABLE 3-continued

Typical permeance results (mol/m$^{-2}$ · s$^{-1}$ · Pa$^{-1}$)

| Membrane | Gas | Pressure (KPa) | 22° C. | 50° C. | 100° C. | 150° C. |
|---|---|---|---|---|---|---|
| K3 | $O_2$ | 300 | | 6.36E−11 | 7.07E−11 | 9.6E−11 |
| K3 | $N_2$ | 300 | | | 5.5E−11 | 7.87E−11 |
| J1 | He | 100 | 1.3E−08 | 1.96E−08 | 3.51E−08 | 5.09E−08 |
| J1 | $H_2$ | 100 | 3.28E−09 | 4.67E−09 | 9.74E−09 | 1.78E−08 |
| S1 | He | 100 | 7.93E−09 | 1.75E−08 | 2.1E−08 | |
| S1 | $CO_2$ | 100 | 7.09E−09 | 8.41E−09 | 7.18E−09 | |
| S2 | $CO_2$ | 100 | 5.13E−09 | 3.54E−09 | 3.9E−09 | 4.13E−09 |
| S6 | $CO_2$ | 150 | 7.01E−10 | 1.2E−09 | 8.63E−10 | 4.89E−10 |

FIG. 2A shows the permeance of membrane J1 as a function of temperature. This figure shows the general trend that as temperature increases the permeance of the J1 membrane to He, $H_2$, $CH_4$ and $CO_2$ also increases.

FIG. 2B shows the permeance of a range of single and two-step membrane to $CO_2$ as a function of temperature. The single step membrane all increase in permeance for temperatures up to 100° C. and then decrease. The significant difference between the single and two-step membranes is that the permeance of the two-step membranes for $CO_2$ is an order of magnitude lower.

These permeation studies highlight that the two-step process produced films that have better pore size control for pores sizes less than 3.4 Å.

Permselectivity—The permselectivity of the membranes of Table 1 are determined and represented below in Table 4. Table 4 also includes the ideal Knudsen separation factor (a*) for additional comparison. Having a permselectvity result higher than the Knudsen separation factor is considered a measure of the quality of a membrane. As all the results in Table 4 are higher than the corresponding Knudsen separation factor it can be concluded that all the membranes produced by both the single and two step processes are of high quality.

The Table. 4 indicates that the K and J membranes, produced by the two step catalysed process have a higher permselectivity for the gases with molecular kinetic diameters $d_k<3$ Å, such as helium and hydrogen, and conversely lower permaselectivity for the gases with $d_k>3$ Å, such as $CO_2$, $O_2$, Ar, $N_2$ and $CH_4$. The single step membranes (S1–5) all show the opposite trend with the poor permselectivity for the gases with molecular kinetic diamters $d_k<3$ Å and higher permseltivity for the gases with $d_k>3$ Å.

TABLE 4

Permselectivity

| | He/$H_2$ | He/$CO_2$ | He/$O_2$ | He/$N_2$ | He/$CH_4$ | $H_2$/$CO_2$ | $H_2$/$CH_4$ | $CO_2$/$CH_4$ | $CO_2$/Ar |
|---|---|---|---|---|---|---|---|---|---|
| a* | 1.41 | 3.32 | 2.83 | 2.65 | 2.00 | 4.69 | 2.83 | 1.66 | 1.06 |
| K1 | 3.6–6.1 | 68–328 | 692 | | 908 | 14–37 | 210 | 2.8 | |
| K2 | 1.9–50 | 296 | | | | 59 | | | |
| K3 | 7.1–8.1 | 77–138 | 96–210 | 212–256 | | 9.6–19 | | | |
| K4 | 2.5–5.0 | 34–98 | | | 303–312 | 13–20 | 61–81 | 3.2–3.5 | |
| K5 | 5.5–6.0 | 121 | | | | 21 | | | |
| J1 | 2.7–4.6 | 165 | | | 680 | 58 | 301 | 5.2 | |
| J2 | | 338 | | | 511 | 41 | 63 | 1.5 | 1.5 |
| S1 | | 1.3–3.0 | | | 146 | | | 56 | 18 |
| S2 | | 2.1–6.7 | 6.1 | 17 | 34 | | | 5.5 | |
| S3 | | 1.1 | | 4.6 | 6.5 | | | 6.1 | 4.6 |
| S4 | | 2.2 | | 148 | 283 | | | 130 | 35 |
| S5 | | | | | | | | | 16–19 |
| S6 | 1.4–3.7 | 6.3–14 | | | | 4.0–5.3 | | | |

The membranes produced by the two-step catalysed hydrolysis process have been found to have extremely high separation factors for hydrogen and/or helium. For example the permselectivity of the two-step catalysed hydrolysis processed film produced separation rates of 860 (He/$CH_4$) while the single-step processed film had separation rates of 283. Those results can be largely attributed to a higher pore control at the region of 3 Å due to a large contribution of the silanol groups ($Q^2$ and $Q^3$ species in Table 2). Silanol groups collapse during film formation due to capillary stress this results in a finer pore control, as exhibited in the two-step membranes. Siloxane groups ($Q^4$ species in Table 2) stiffen the silica matrix opposing capillary stress resulting in slightly large pore size as exhibited by the single step membranes.

Energy of Activation and Energy of Mobility—The energy of activation ($E_a$) and the energy of mobility ($E_m$) for a range of gases is determined for the sample membranes found in Table 1, are shown in Table 5. It can be seen from Table 5 that the energy of mobility and activation for the two step membranes is higher than the single step films. This correlates directly to the respective pore sizes of the membranes, that is the mobility is lower for the larger pores of the single step membranes and higher for the smaller pores of the two-step membranes. This reinforces the ability of the two-step process to control pores size at less than 3.4 Å.

TABLE 5

| | | | | | | Indicative energy of mobility | | | | |
|---|---|---|---|---|---|---|---|---|---|---|
| $H_2$ | $CO_2$ | $O_2$ | $N_2$ | $CH_4$ | | $H_2$ | $CO_2$ | $O_2$ | $N_2$ | $CH_4$ |
| $E_a$ | $E_a$ | $E_a$ | $E_a$ | $E_a$ | Memb | $E_m$ | $E_m$ | $E_m$ | $E_m$ | |
| 16.8 | 4.4 | | | | K1 | 23.8 | 22.4 | | | |
| 10.5 | | | | | K2 | 17.5 | | | | |
| 15.1 | 7.0 | 6.0 | 9.4 | | K3 | 22.1 | 26.0 | 24.0 | 24.4 | |
| 11.4 | 5.0 | | 9.6 | | K4 | 18.4 | 23.0 | | | 28.6 |
| 14.5 | | | | | J1 | 21.5 | | | | |
| | −4.0 | | | | S1 | | 14.0 | | | |
| | 1.9 | | | | S2 | | 19.9 | | | |

The sol-gel formulation and process of the invention is designed to provide the right balance between high separation (permselectivity) while maintaining high permeation (flux) of gases.

The membranes produced by the two-step catalysed process result in the presence of both good pore size control and high permselectivity for molecular diameters of less than 3 Å. The membranes of the invention also exhibit higher energies of activation and mobility than the single-step membranes.

Control of the pore size within the membranes is a key component to achieving the desired permselectivity. It is believed that the formation of silanol groups ($Q^2$ and $Q^3$) during the membrane fabrication contribute highly to the formation of the weakly branched silica chains. It is thought that the two-step catalysed process of membrane formation coupled with low silica:water molar ratios inhibits the condensation reactions thus resulting in a lower formation of the fully condensed species ($Q^4$). It is the formation of the weakly branched silica chains ($Q^2$ and $Q^3$ species) that are a significant contributing control factor on the pore size of the film.

The higher contribution of the uncondensed species ($Q^2$ and $Q^3$) or the lesser contribution of the condensed species ($Q^4$) form mutually transparent structures which interpenetrate one another resulting in densification of the membrane matrix and therefore reduced the pore size of the membrane. During the heat treatment step not only is the solvent removed but the surface tension created in the gel causes the network to collapse.

Furthermore, it has been found that the use of nitric acid as a catalyst in the two-step catalysed hydrolysis process contributes to finer pore control than other known catalysts such as hydrogen chloride.

Throughout the specification the aim has been to describe the preferred embodiments of the invention without limiting the invention to any one embodiment or a specific collection of features.

What is claimed is:

1. A method of producing weakly branched silica membranes coated onto a substrate using a two-step catalysed hydrolysis sol-gel process including the steps of:

forming a tetraethylorthosilicate (TEOS)/ethanol solution;

placing the TEOS/ethanol solution in an ice bath;

forming an acid/water solution;

adding the acid/water solution to the TEOS/ethanol solution to form a TEOS/ethanol/acid/water solution;

refluxing the TEOS/ethanol/acid/water solution;

preparing a two-step sol by adding water and nitric acid to the refluxed TEOS/ethanol/acid/water solution and initiating a two-step sol-gel process;

depositing a membrane film layer on a substrate from the two-step sol to form a substrate coated with weakly branched silica membranes.

2. The method of claim 1, wherein the refluxing step is carried out on the TEOS/ethanol/acid/water solution having a molar composition of 1.0 TEOS:3.8 ethanol:1.0 water 7.0×10$^{-4}$M nitric acid.

3. The method of claim 1, wherein the refluxing step is conducted at approximately 60° C. for about 180 minutes in a water bath.

4. The method of claim 1, wherein the step of preparing a two-step sol results, in the formation of a two-step sol having a molar composition of 1.0 TEOS:3.8 ethanol:6.0 water.0.1 nitric acid.

5. The method of claim 1, wherein the substrate is prepared with one or more prime layers.

6. The method of claim 1, wherein the substrate is prepared with one or more intermediate layers.

7. The method of claim 1, wherein the substrate is prepared with one or more prime layers and one or more intermediate layers.

8. The method of claim 1, further including the step of heat treating the substrate coated with weakly branched silica membranes.

9. The method of claim 8, wherein the heat treatment step is carried out at temperatures between 400° C. and 60020 C. with an air flow of 100 ml per minute.

10. The method of claim 8, wherein the heat treatment is carried out at approximately 500° C.

11. A weakly branched silica membrane when produced by the method of claim 1.

12. A weakly branched silica membrane when produced by the method of claim 1, wherein the weakly branched silica membrane has an average pore size of less than 3 Å and a film thickness of between 0.1 and 0.5 μm.

13. A weakly branched silica membrane of claim 12, wherein the weakly branched silica membrane has a high permselectivity for gases with molecular kinetic diameters ($d_k$) less than 3 Å.

* * * * *